(No Model.)
J. H. PORTER.
CYLINDER COCK STEAM ESCAPE.
No. 290,924. Patented Dec. 25, 1883.
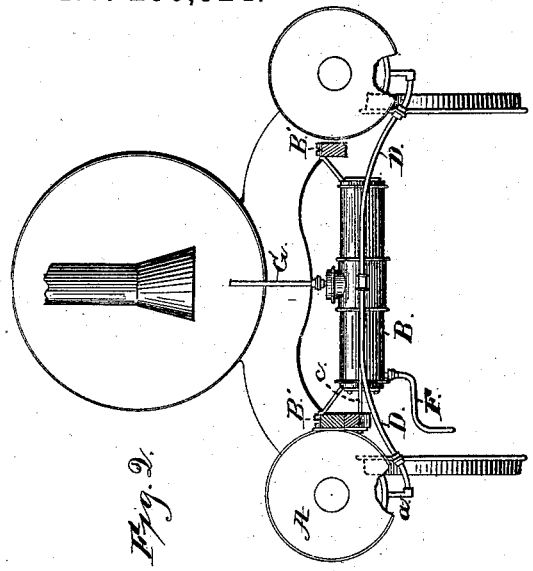
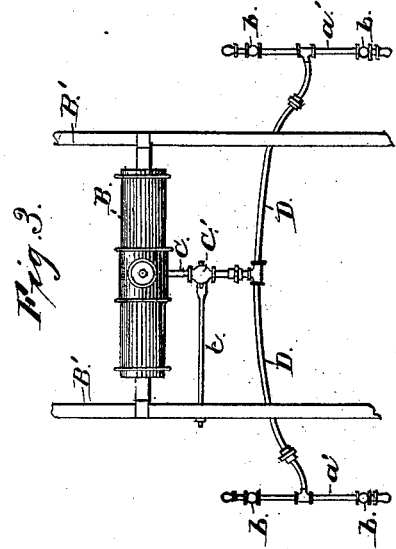
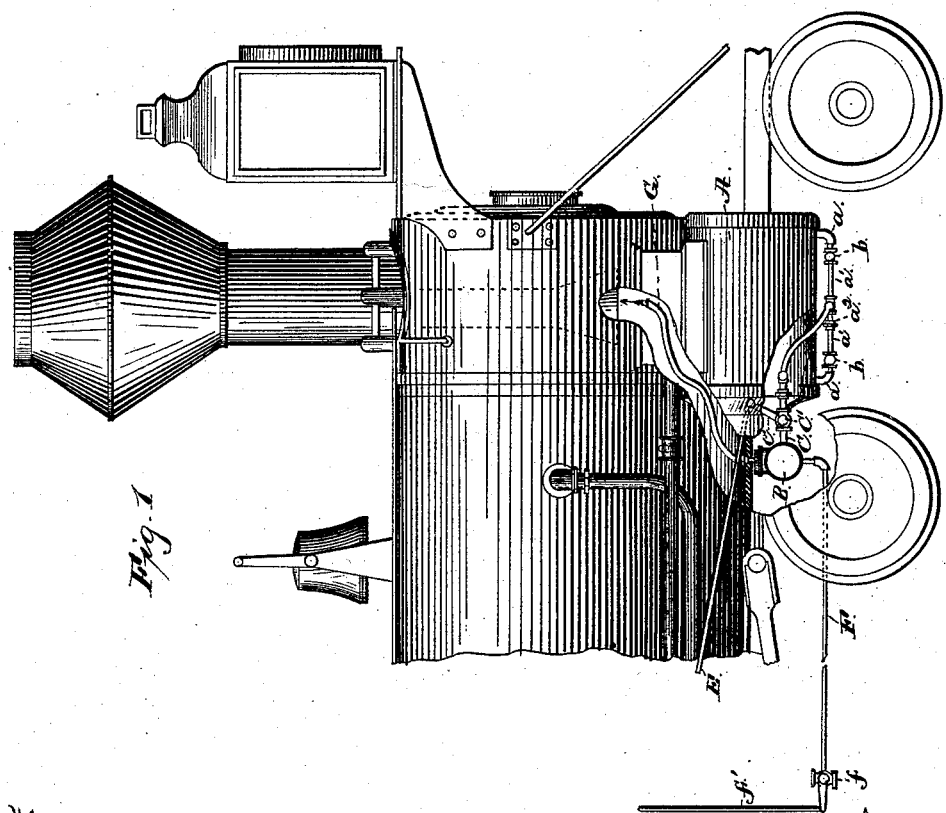
Witnesses
N. A. Clark.
P. B. Turpin.
Inventor
John H. Porter
By R. S. & A. P. Lacey
Attorneys

UNITED STATES PATENT OFFICE.

JOHN HARRSON PORTER, OF JACKSON, MICHIGAN, ASSIGNOR OF ONE-HALF TO JOHN W. TWIGGS, OF SAME PLACE.

CYLINDER-COCK STEAM-ESCAPE.

SPECIFICATION forming part of Letters Patent No. 290,924, dated December 25, 1883.

Application filed October 26, 1883. (No model.)

*To all whom it may concern:*

Be it known that I, JOHN H. PORTER, a citizen of the United States, residing at Jackson, in the county of Jackson and State of Michigan, have invented certain new and useful Improvements in Cylinder-Cock Steam-Escapes; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in cylinder-cock escapes, and has for its object to provide efficient means whereby the escaping steam may be carried off through the smoke-box.

It consists in the improvements hereinafter fully described, and pointed out in the claims.

In the drawings, Figure 1 is a side view of a portion of a locomotive having my improvements attached, parts of the smoke-box, cylinder, and wheel being broken away. Fig. 2 is a detached vertical section, showing my devices in elevation; and Fig. 3 is a top plan view of my improved devices detached from the engine.

The cylinders A A are provided with plugs $a$ $a$, arranged near each end. These plugs of each cylinder are connected by a pipe, $a'$, which is preferably made in sections connected by union-couplings $a^2$, as shown. Check-valves $b$ $b$ are arranged in the pipe $a'$ near the ends of same and the plugs $a$. The water-chamber B is supported on the frames B' in rear of the cylinders. A pipe, C, extends forward from this water-chamber, and is connected by pipes D D with the pipes $a'$ at a point between the check-valves $b$. A valve, C', is arranged in the pipe C, and provided with stem or shaft $c$, which extends to the side of the engine, and has a crank-arm, $c'$, formed on its outer end. A rod, E, is secured to this crank-arm, and extends into the cab of the engine, or elsewhere in convenient reach of the operator. A water-discharge pipe, F, is secured to the under side of the chamber B, and extends back to the rear of the engine, and has a valve, $f$, arranged at its rear end, and provided with a rod, $f'$, whereby it may be operated. This rod may be run into the cab, or otherwise arranged in convenient reach of the operator. A steam-discharge pipe, G, extends from the upper side of the chamber B forward into the smoke-box, and terminates at a point under or within the smoke-stack, as most clearly shown in Fig. 1.

The necessity of cylinder-cock escapes is obvious to all skilled in the art.

My device, as above described, obviates the blowing of the steam out into the air, which wets the depot-platform, scares horses, and blows dust and grit onto the engine, injuring the same, and adding to the trouble and expense required to keep the engine clean.

In operation, when it is desired to release the water from the cylinders, the valve C' may be opened, in the manner described, and the steam passes into the chamber B, and thence through pipe G out of the smoke-stack. The water condensed in the cylinders passes with the steam into the water-chamber. When the steam has escaped the valve C' is closed, and the valve $f$ is opened and the water flows out through pipe F, and is discharged at the rear of the engine.

Having described my invention, what I claim, and desire to secure by Letters Patent, is—

1. In a cylinder-cock escape, the water-chamber connected by pipes controlled by valves with the cylinders, and having a steam-discharge through the smoke-stack, and an independent water-discharge, all arranged and operating substantially as and for the purposes specified.

2. The cylinder-cock escape, substantially as described and shown, composed of the cylinder-plugs, connected by an intervening pipe, check-valves arranged in said pipe, the water-chamber connected by pipe C D with the cylinder-pipes, the valve arranged in said pipe, and provided with stem $c$, having crank $c'$, handle-rod extended within reach of the operator, and the steam-discharge G, extending into the smoke-box, and the water-discharge F, all arranged and operating substantially as described, and for the purposes specified.

3. In a cylinder-cock escape, the combination of the cylinders provided with suitable cocks, the chamber provided with independent water and steam discharge pipes, and a pipe or pipes connecting the said chamber and the cylinders, substantially as set forth.

In testimony whereof I affix my signature in presence of two witnesses.

JOHN HARRSON PORTER.

Witnesses:
LEWIS M. POWELL,
J. W. TWIGGS.